United States Patent [19]

Minoura et al.

[11] Patent Number: 4,726,389

[45] Date of Patent: Feb. 23, 1988

[54] METHOD OF CONTROLLING INJECTOR VALVE

[75] Inventors: Mikio Minoura; Shoji Ito, both of Obu, Japan

[73] Assignee: Aisan Kogyo Kabushiki Kaisha, Aichi, Japan

[21] Appl. No.: 940,405

[22] Filed: Dec. 11, 1986

[51] Int. Cl.[4] .............................................. F16K 31/04

[52] U.S. Cl. .................................... 137/1; 251/129.05; 251/129.06; 251/129.21; 123/490; 361/153; 239/585

[58] Field of Search ....................... 251/129.05, 129.21, 251/129.06; 123/490; 361/153; 239/585, 102.2; 137/1

[56] References Cited

U.S. PATENT DOCUMENTS

| | | | |
|---|---|---|---|
| 4,176,822 | 12/1979 | Chadwick | 251/129.06 |
| 4,350,319 | 9/1982 | Kawata et al. | 251/129.21 X |
| 4,385,339 | 5/1983 | Takada et al. | 251/129.21 X |

FOREIGN PATENT DOCUMENTS

| | | |
|---|---|---|
| 60-81568 | 5/1985 | Japan . |

OTHER PUBLICATIONS

DeGrace, Louis G. et al, "The Bendix DEKA Fuel Injector Series-Design and Performance", *Developments in Electronic Engine Management and Driveline Controls SP*-609, pp. 57-63, Feb. 25-Mar. 1, 1985.

*Primary Examiner*—Arnold Rosenthal

*Attorney, Agent, or Firm*—Dennison, Meserole, Pollack & Scheiner

[57] ABSTRACT

In an injector for intermittently injecting liquid fuel by supplying a pulse signal to an actuator and reciprocating an injector valve, a method of controlling the injector valve comprising the steps of temporarily cutting supply of a pulse signal to the actuator to suppress inertia of the injector valve and thereby stabilize opening characteristics of the valve just before full opening of the valve during an opening stroke of the valve, and temporarily supplying the pulse signal after the cutting step of the pulse signal to the actuator to suppress inertia of the injector valve and thereby stabilize closing characteristics of the valve just before full closing of the valve during a closing stroke of the valve.

9 Claims, 7 Drawing Figures

METHOD OF CONTROLLING INJECTOR VALVE

BACKGROUND OF THE INVENTION

The present invention relates a method of controlling a valve of an injector for supplying fuel to an engine, and more particularly to a method of controlling a valve driving operation of the injector using a stacked piezoelectric ceramics.

Conventionally, in a fuel injector including a stacked piezoelectric ceramics for reciprocating a valve and controlling an amount of fuel to be injected to the engine, a pulse signal is supplied to the stacked piezoelectric ceramics to lift the valve against a biasing force of a spring, and the supply of the pulse signal is cut to return the valve to its closed position by the biasing force of the spring. In the conventional injector, a pulse width in each pulse rate as shown in FIG. 1A is changed to vary a fuel flow rate in a linear range between Q1 and Q2 as shown in FIG. 2.

However, even when a rectangular pulse waveform as shown in FIG. 1A is supplied to the piezoelectric ceramics, a waveform of a valve stroke is disturbed at the stroke end as shown in FIG. 1B because the valve bounds at the stroke end. Therefore, the linear range between Q1 and Q2 in FIG. 2 is shortened to reduce a flow control range, thereby causing reduction in engine operational characteristics. Further, at the end of the valve opening stroke, the valve strongly collides with the stopper by the driving force of the stacked piezoelectric ceramics, while at the end of the valve closing stroke, the valve strongly collides with the valve seat by the biasing force of the spring. As a result, a valve operational noise is generated from the injector upon bounding of the valve, and life of the valve is shortened.

SUMMARY OF THE INVENTION

It is an object of the present invention to provide a method of controlling an injector valve which may reduce a valve operating noise and greatly improve durability of the valve with a fuel control range increased.

According to one aspect of the present invention, in an injector for intermittently injecting liquid fuel by supplying a pulse signal to an actuator and reciprocating an injector valve, there is provided a method of controlling the injector valve comprising the steps of temporarily cutting supply of a pulse signal to the actuator to suppress inertia of the injector valve and thereby stabilize opening characteristics of the valve just before full opening of the valve during an opening stroke of the valve, and temporarily supplying the pulse signal after the cutting step of the pulse signal to the actuator to suppress inertia of the injector valve and thereby stabilze closing characteristics of the valve just before full closing of the valve during a closing stroke of the valve.

According to another aspect of the present invention, in an injector for intermittently injecting liquid fuel by supplying a pulse signal to an actuator and reciprocating an injector valve, there is provided a method of controlling the injector valve comprising the step of temporarily cutting supply of a pulse signal to the actuator to suppress inertia of the injector valve and thereby stabilze opening characteristics of the valve just before full opening of the valve during an opening stroke of the valve.

According to a further aspect of the present invention, in an injector for intermittently injecting liquid fuel by supplying a pulse signal to an actuator and reciprocating an injector valve, there is provided a method of controlling the injector valve comprising the step of temporarily supplying the pulse signal just before full closing of the valve during a closing stroke of the valve to suppress inertia of the injector valve and thereby stabilize closing characteristics of the valve.

In operation, when the pulse signal is supplied to the actuator, the injector valve is opened, and when the supply of the pulse signal is cut, the valve is closed by the biasing force of the spring. Just before full opening and/or closing of the valve during the valve opening and/or closing stroke, the supply of the pulse signal is temporarily cut and/or effected to such an extent that inertia of the valve in the opening and/or closing direction may be suppressed. Accordingly, the kinetic energy of the valve is almost cancelled to let the valve gently abut against the stopper and/or the valve seat. That is to say, the valve does not bound at the opening and/or closing stroke end, thereby stabilizing the opening and/or closing characteristics of the injector valve.

The invention will be more fully understood from the following detailed description and appended claims when taken with the drawings.

DETAILED DESCRIPTION OF THE PREFERRED EMBODIMENTS

Figure 1A:
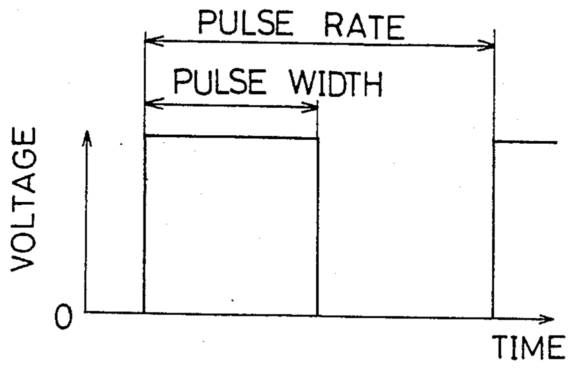
Fig. 1A PRIOR ART
FIGS. 1A and 1B are graphs showing valve operation characteristics in relation to pulse waveform and valve stroke in the prior art.

A front case 2 and a rear case 3 are assembled with each other to form an injector housing 4 with an O-ring seal 1 interposed therebetween. A valve housing 7 is housed in the front case 2 with an O-ring seal 6 interposed therebetween, and a stopper 5 is interposed between the valve housing 7 and the injector housing 4. A valve body 10 having a ball valve 8 and a sleeve plunger 9 is housed in the valve housing 7. The valve body 10 is axially movable within a limited distance between the front end surface of the stopper 5 and a valve seat 12 formed in the periphery of a fuel injection hole 11 at the front end of the valve housing 7. The fuel injection hole 11 is closed when the valve body 10 is moved toward the fuel injection hole 11 and the valve 8 abuts against the valve seat 12, while the fuel injection hole 11 is opened when the valve body 10 is moved toward the stopper 5, thereby allowing fuel to flow through a slit 13 of the stopper 5, communication holes 14 formed at both ends of the plunger 9 and a fuel passage 15 in the sleeve plunger 9 and injecting the fuel from the fuel injection hole 11.

A piping connector 16 is connected to the rear case 3 of the injector housing 4, and an actuator 17 for reciprocatively driving the valve body 10 is mounted in the rear case 3. The actuator 17 includes a stacked piezoelectric ceramics 18 adapted to be expanded in the direction of stack by receiving a pulse signal, a liver 19 having a cross-sectional S-shaped configuration and adapted to be widened by the expansion of the stacked piezoelectric ceramics 18, a displacement magnifying strip 20 adapted to be outwardly stretched from its normal curved condition to its linear condition by the widening of the lever 19, and a connecting member 21 for connecting the actuator 17. A small-diameter screw 26 is engaged in the large-diameter screw 25, so as to adjust the return force of the valve body 10.

Figure 4:
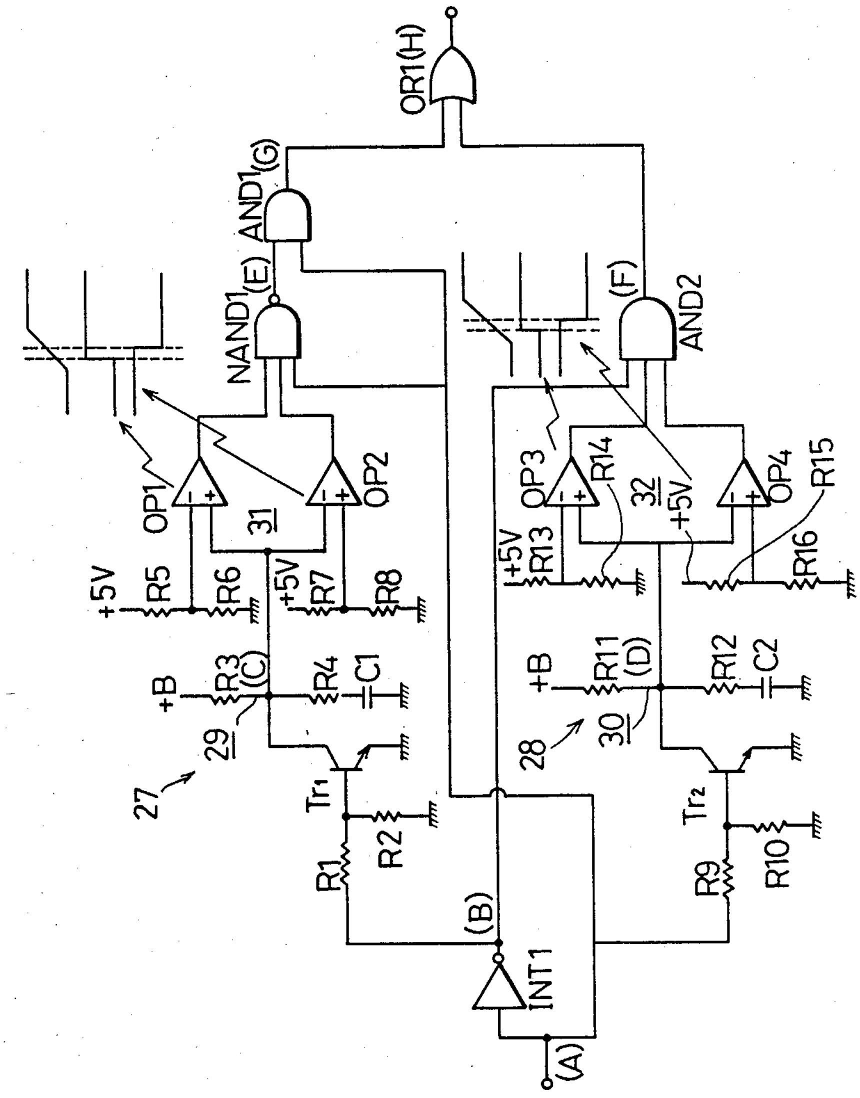
FIG. 4 is an electrical circuit diagram according to the present invention.
Figure 5:
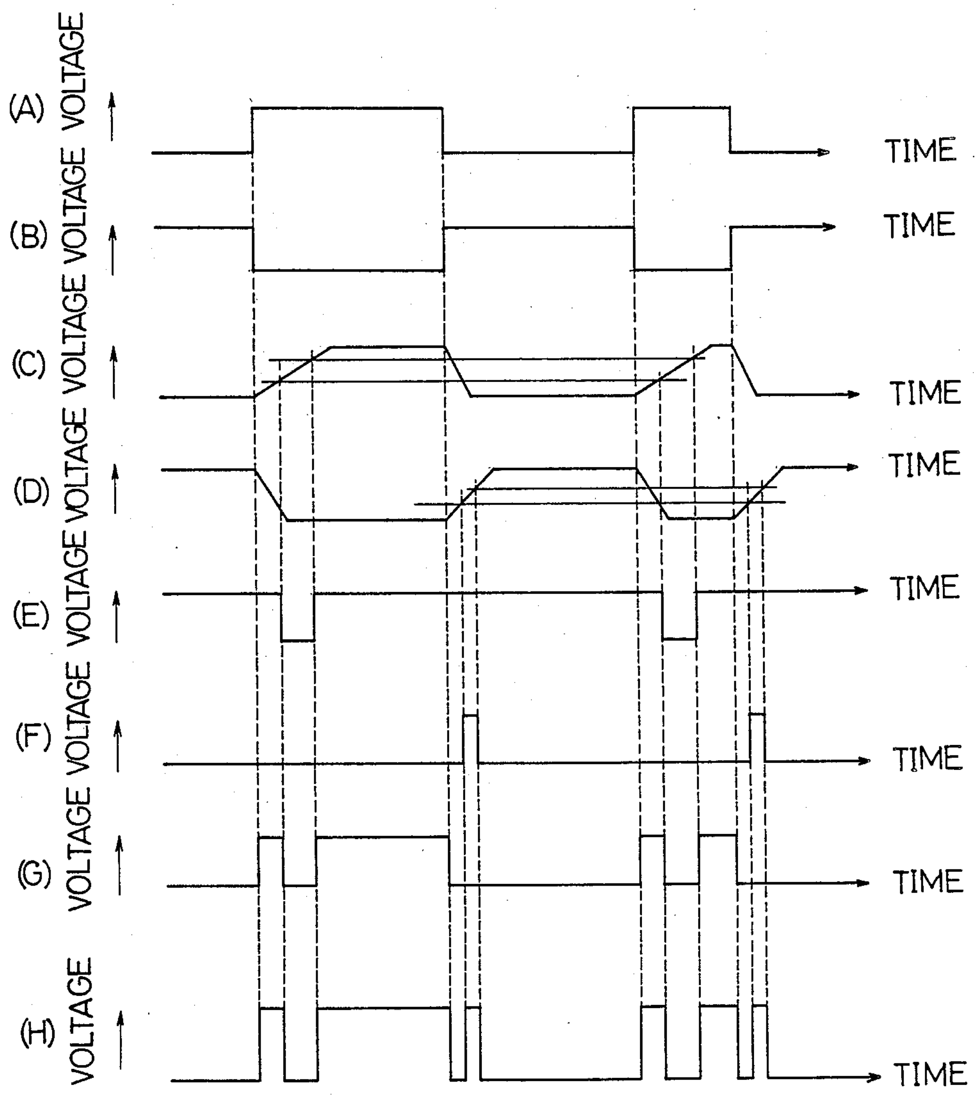
FIG. 5 is a pulse waveform chart in the electrical circuit diagram of FIG. 4.

FIG. 4 is an electrical control circuit diagram for changing a pulse waveform to be supplied to the ceramics 18 according to an amount of fuel to be injected to the engine. The pulse waveform as shown in FIG. 5(A) is fed through an inverter INT 1 to a transistor Tr1 in a valve opening characteristics control circuit 27 and a transistor Tr2 in a valve closing characteristics control circuit 28. The valve opening characteristics control circuit 27 operates to cut a pulse for a very short time, so as to suppress a valve opening inertia just before opening of the valve to stabilize the valve opening characteristics. The valve closing characteristics control circuit 28 operates to supply a pulse of a very short width to the stacked piezoelectric ceramics 18, so as to suppress a valve closing inertia just before closing of the valve to stabilze the valve closing characteristics. CR circuits 29 and 30 are controlled by the transistors Tr1 and Tr2, respectively, and CR waveforms shown in FIGS. 5(C) and 5(D) generated from the CR circuits 29 and 30 are fed to a window comparator 31 consisting of operational amplifiers OP1 and OP2 and a window comparator 32 consisting of operational amplifiers OP3 and OP4, respectively. Outputs from the window comparator 31 and the input waveform shown in FIG. 5(A) to the control circuit 28 are fed to a NAND circuit NAND1. An output from the NAND circuit NAND1 as shown in FIG. 5(E) and the input waveform shown in FIG. 5(A) to the control circuit 27 are fed to an AND circuit AND1, which in turn generates an output waveform shown in FIG. 5(G). The output waveform is supplied through an OR circuit OR1 to the stacked piezoelectric ceramics 18. On the other hand, outputs from the window comparator 32 and the input waveform shown in FIG. 5(B) to the control circuit 27 are fed to an AND circuit AND2. An output from the AND circuit AND2 as shown in FIG. 5(F) is supplied through the OR circuit OR1 to the stacked piezoelectric ceramics 18. After all, a waveform as shown in FIG. 5(H) is generated from the OR circuit OR1.

In the electrical control circuit shown in FIG. 4, R1–R16 denote resistors and C1 and C2 denote capacitors. Especially, the resistors R3 and R4 and the capacitor C1 in the CR circuit 29 and the resistors R11 and R12 and the capacitor C2 in the CR circuit 30 operate to suitably adjust a change timing of the pulse waveform in the present invention.

Figure 1B:
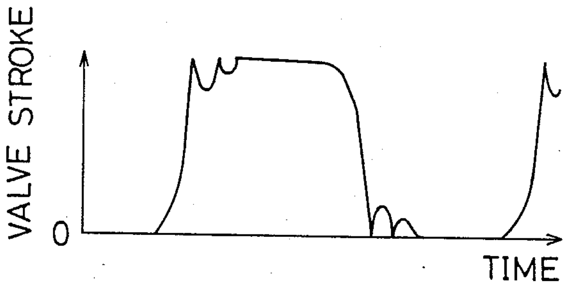
Fig. 1B PRIOR ART

In the valve control circuit for an injector 33, upon rising of the pulse waveform as shown in FIG. 5(A) having a period and a duty ratio according to a fuel injection amount, the transistors Tr2 is turned on to make inoperative the valve closing characteristics control circuit 28 according to a change in the pulse waveform. On the contrary, the valve opening characteristics control circuit 27 is operated in the OFF state of the transistor Tr1 to increase the output from the CR circuit 29 as shown in FIG. 5(C). In the course of such an increase of the output, the outputs from the operational amplifiers OP1 and OP2 of the window comparator 31 are inverted. As a result, the pulse waveform genrated from the OR circuit OR1 as shown in FIG. 5(H) is such that the supply of the pulse signal is temporarily cut at a timing of at least about 70% of the opening stroke of the valve body 10, and a kinetic energy of the valve body 10 is suppressed by the biasing force of the spring 22 just before the valve body 10 abuts against the stopper 5. Accordingly, the valve body 10 does not bound at the end of the opening stroke as shown in FIG. 1B, but may carry out a stable opening operation as shown in FIG. 6.

Next, when the supply of the pulse signal is ended, and the pulse waveform falls, the transistor Tr1 is turned on to make inoperative the valve opening characteristics control circuit 27 according to a change in the pulse waveform. On the contrary, the valve closing characteristics control circuit 28 is operated in the OFF state of the transistor Tr2 to increase the output from the CR circuit 30 as shown in FIG. 5(D). In the course of such an increase of the output, the output from the operational amplifiers OP3 and OP4 of the window comparator 32 are inverted. As a result, the pulse waveform generated from the OR circuit OR1 as shown in FIG. 5(H) is such that the pulse signal is temporarily supplied at a timing of at least about 70% of the closing stroke of the valve body 10, and a kinetic energy of the valve body 10 is suppressed by the expanding force of the stacked piezoelectric ceramics 18 just before the valve body 10 abuts against the valve seat 12. Accordingly, the valve body 10 does not bound at the end of the closing stroke as shown in FIG. 1B, but may carry out a stable closing operation as shown in FIG. 6.

Figure 6:
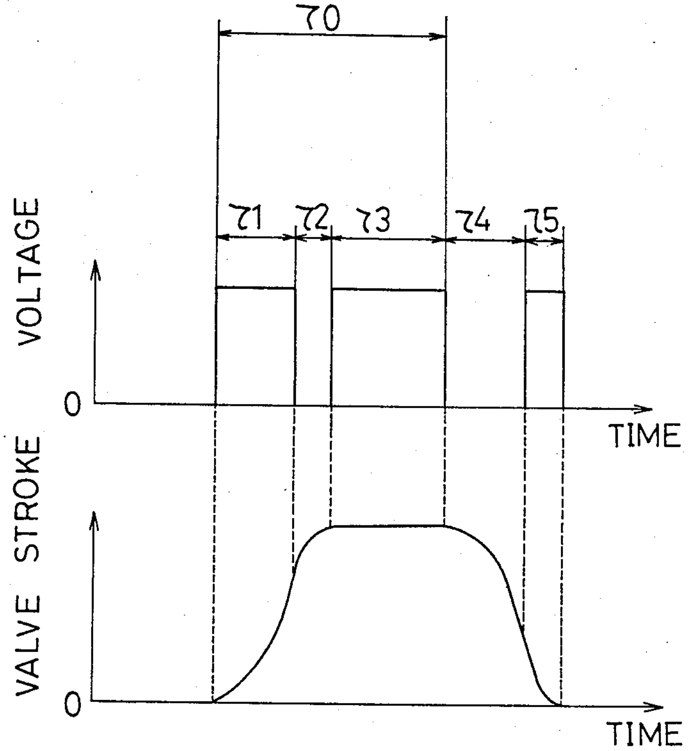
FIG. 6 is a graph showing valve operation characteristics in relation to pulse waveform and valve stroke according to the present invention.

Referring to FIG. 6, the pulse waveform shown in FIG. 5(A) having a pulse width $\tau_0$ is converted into the pulse waveform shown in FIG. 5(H). In comparison of the pulse waveform as converted with a valve stroke, a pulse signal is supplied to the stacked piezoelectric ceramics 18 for a period of $\tau_1$ to open the valve body 10. Then, the supply of the pulse signal is cut for a period of $\tau_2$ just before the end of the valve opening stroke to suppress the inertia of the valve body 10. Then, the pulse signal is again supplied for a period of $\tau_3$ to inject a predetermined amount of fuel corresponding to the pulse width $\tau_0$ from the injection hole. Then, the supply of the pulse signal is cut for a period of $\tau_4$ during the valve closing stroke, and the pulse signal is again supplied for a period of $\tau_5$ to suppress the inertia of the valve body 10. Thus, the valve body 10 does not bound at the stroke end, thereby stabilizing the valve operation.

Figure 2:
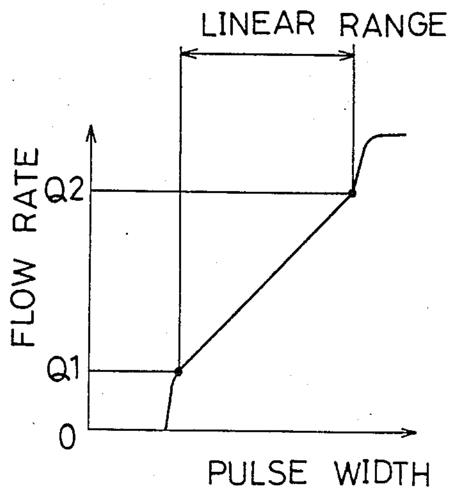
FIG. 2 is a graph showing the relation between a pulse width and a fuel flow control.
Figure 3:
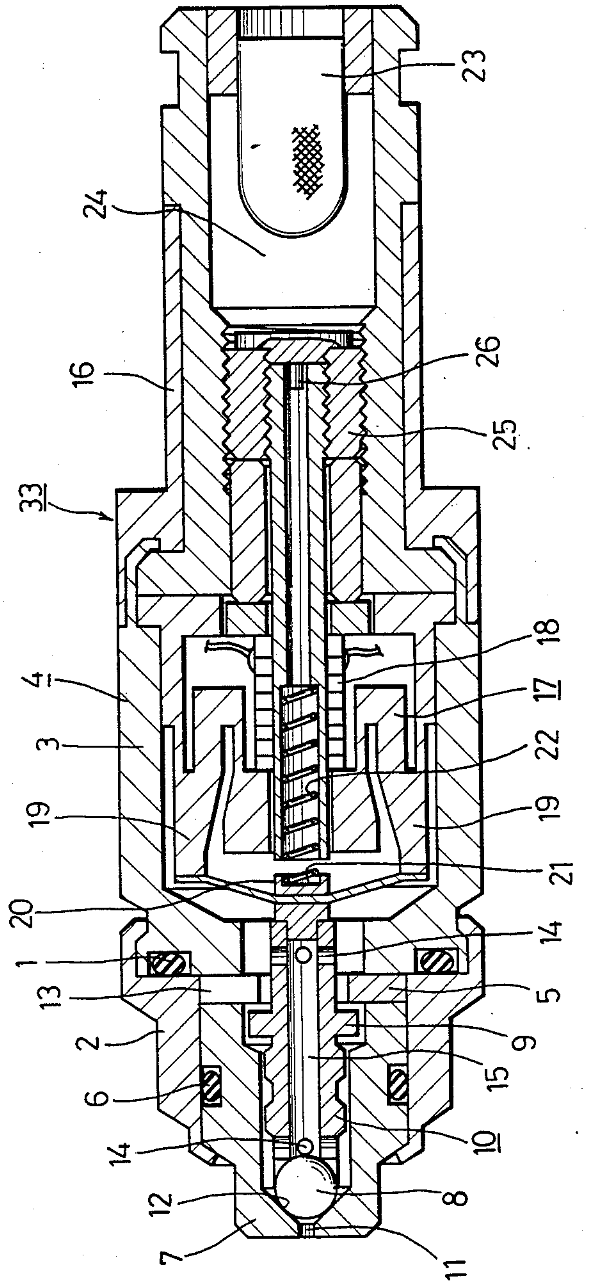
FIG. 3 is a sectional side view of the fuel injector used in a preferrred embodiment of the present invention.

As a result, an increased linear range between Q1 and Q2 as shown in FIG. 2 may be obtained to thereby increase a fuel control range, and greatly improve durability of the valve with an operating noise reduced.

Although the inertia of the valve body 10 is suppressed during both the valve opening and closing strokes by providing both the valve opening characteristics control circuit 27 and the valve closing characteristics control circuit 28 in the preferred embodiment, either of the control circuit 27 or the control circuit 28 may be provided to control either of the valve opening stroke or the valve closing stroke, or especially to control only the valve closing stroke to obtain the same effect.

Having thus described the preferred embodiment of the invention, it should be understood that numerous structural modifications and adaptations may be made without departing from the spirit of the invention.

What is claimed is:

1. In an injector for intermittently injecting liquid fuel by supplying a pulse signal to an actuator and reciprocating an injector valve, a method of controlling said injector valve comprising the steps of temporarily cutting supply of the pulse signal to said actuator to suppress inertia of said injector valve and thereby stabilize opening characteristics of said valve just before full opening of said valve during an opening stroke of said valve, and temporarily supplying the pulse signal after the cutting step of the pulse signal to said actuator to suppress inertia of said injector valve and thereby stabilze closing characteristics of said valve just before full closing of said valve during a closing stroke of said valve.

2. The method as defined in claim 1, wherein said step of temporarily cutting the supply of the pulse signal to said actuator is effected at a timing of at least about 70% of the opening stroke of said valve, and said step of temporarily supplying the pulse signal after the cutting step of the pulse signal is effected at a timing of at least about 70% of the closing stroke of said valve.

3. The method as defined in claim 1, wherein said actuator comprises a stacked piezoelectric ceramics.

4. In an injector for intermittently injecting liquid fuel by supplying a pulse signal to an actuator and reciprocating an injector valve, a method of controlling said injector valve comprising the step of temporarily cutting supply of a pulse signal to said actuator to suppress inertia of said injector valve and thereby stabilze opening characteristics of said valve just before full opening of said valve during an opening stroke of said valve.

5. The method as defined in claim 4, wherein said step of temporarily cutting the supply of the pulse signal to said actuator is effected at a timing of at least about 70% of the opening stroke of said valve.

6. The method as defined in claim 4, wherein said actuator comprises a stacked piezoelectric ceramics.

7. In an injector for intermittently injecting liquid fuel by supplying a pulse signal to an actuator and reciprocating an injector valve, a method of controlling said injector valve comprising the step of temporarily supplying the pulse signal just before full closing of said valve during a closing stroke of said valve to suppress inertia of said injector valve and thereby stabilize closing characteristics of said valve.

8. The method as defined in claim 7, wherein said step of temporarily supplying the pulse signal is effected at a timing of at least about 70% of the closing stroke of said valve.

9. The method as defined in claim 7, wherein said actuator comprises a stacked piezoelectric ceramics.

* * * * *